Figure 1:
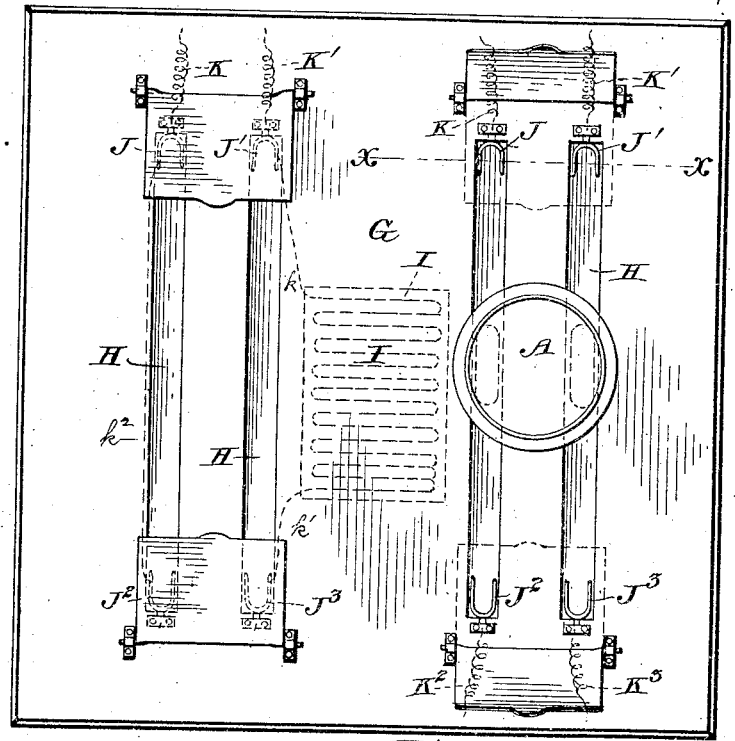

(No Model.)

2 Sheets—Sheet 1.

H. G. O'NEILL.
COOKING AND HEATING APPARATUS.

No. 535,072.  Patented Mar. 5, 1895.

Witnesses
Severance
Chas R. McBride

Inventor
Henry G O'Neill
by
W H Babcock
Attorney (No Model.) 2 Sheets—Sheet 2.

H. G. O'NEILL.
COOKING AND HEATING APPARATUS.

No. 535,072. Patented Mar. 5, 1895.

Witnesses
Severance
Parks R. McBride

Inventor
Henry G. O'Neill
by
W. H. Babcock
Attorney

UNITED STATES PATENT OFFICE.

HENRY G. O'NEILL, OF BOSTON, MASSACHUSETTS, ASSIGNOR TO EDWARD JEWELL, OF SAME PLACE, AND CHARLES W. WELCH, OF STOUGHTON, MASSACHUSETTS.

COOKING AND HEATING APPARATUS.

SPECIFICATION forming part of Letters Patent No. 535,072, dated March 5, 1895.

Application filed February 8, 1894. Serial No. 499,445. (No model.)

*To all whom it may concern:*

Be it known that I, HENRY G. O'NEILL, a citizen of the United States, residing at Boston, in the county of Suffolk and State of Massachusetts, have invented certain new and useful Improvements in Cooking and Heating Apparatus; and I do hereby declare the following to be a full, clear, and exact description of the invention, such as will enable others skilled in the art to which it appertains to make and use the same.

This invention pertains to the art of heating by electricity and more especially to electrically heating utensils which contain resistances, by placing them on a range table or other support provided with conductors and contacts for making circuit through the resistance when the utensil is set on the said support.

The chief object of the said invention is to make this use of electricity practical to untrained hands by dispensing with wires and attachments dangling from the utensil, which prove a constant source of annoyance and inconvenience, and a continual menace to the uninitiated, frequently causing short circuits and other troubles that tend to keep electricity out of domestic use. To this end I provide the implement or utensil with rigidly attached bars or pieces, called projectors, which may also serve as feet for it, of electrically conducting material insulated from the body of the said utensil, extending below the same and connected electrically with the ends of the insulated resistance. An implement or utensil thus constructed forms the subject matter of my application filed March 23, 1894, Serial No. 504,864. I adapt the range or other support of the said utensil thereto, by providing it with contact pieces, arranged in pairs in grooves or recesses formed in the upper part of the said support, so that when the said utensil is placed thereon with its projectors entering the said grooves they may easily be moved into contact with the said contact pieces, thereby closing the circuit through the resistance aforesaid. Also an additional resistance is placed in the range or support itself and one or more pairs of the said contact pieces are wired to it so that when the circuit is closed through any such pair the said additional resistance, being in the same circuit, will reduce the power of the electric current, suiting it to the action of a slow fire; whereas if the circuit be closed through contacts not connected to this extra resistance the full force of the current, with the effect of a hot fire, will be applied to the resistance in the utensil. A range or support thus constructed, provided, and adapted forms the subject matter of my application filed February 14, 1894, Serial No. 500,136.

In the present application I do not claim either the utensil *per se* or the range or support *per se;* but the subject matter of my invention, as hereinafter claimed, consists in the combination of the aforesaid devices and in certain improvements hereinafter more particularly set forth.

Figure 2:
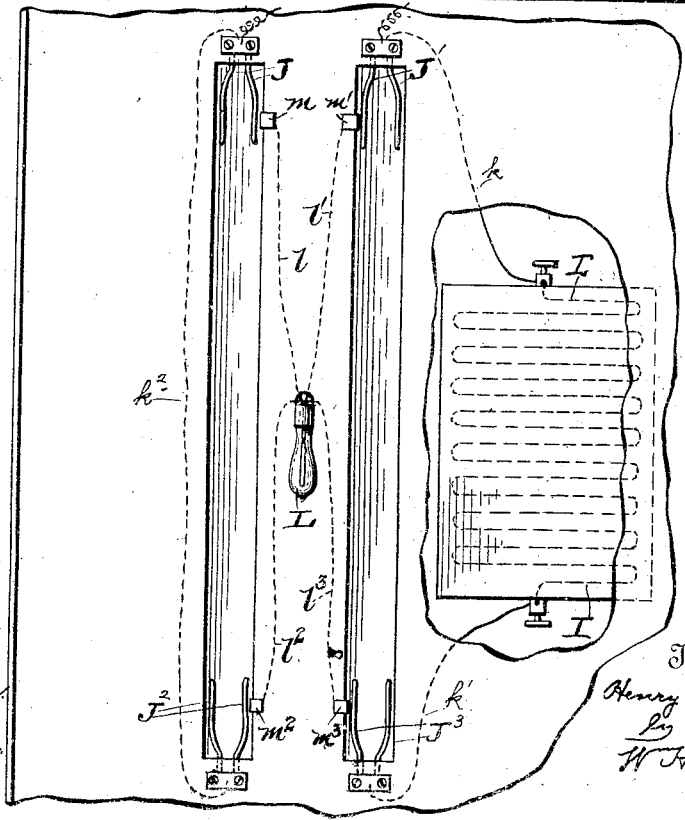
Figure 3:
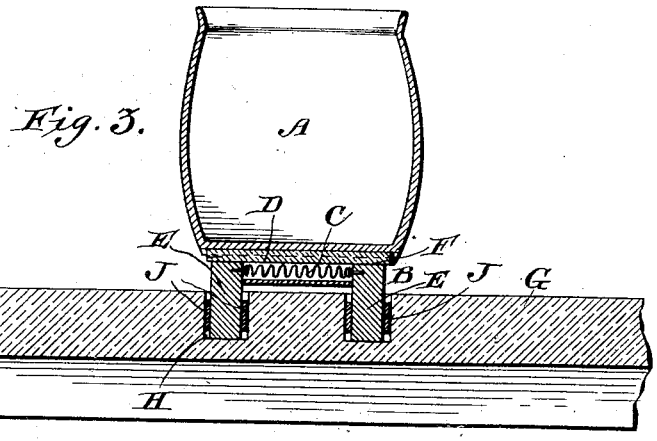
Figure 4:
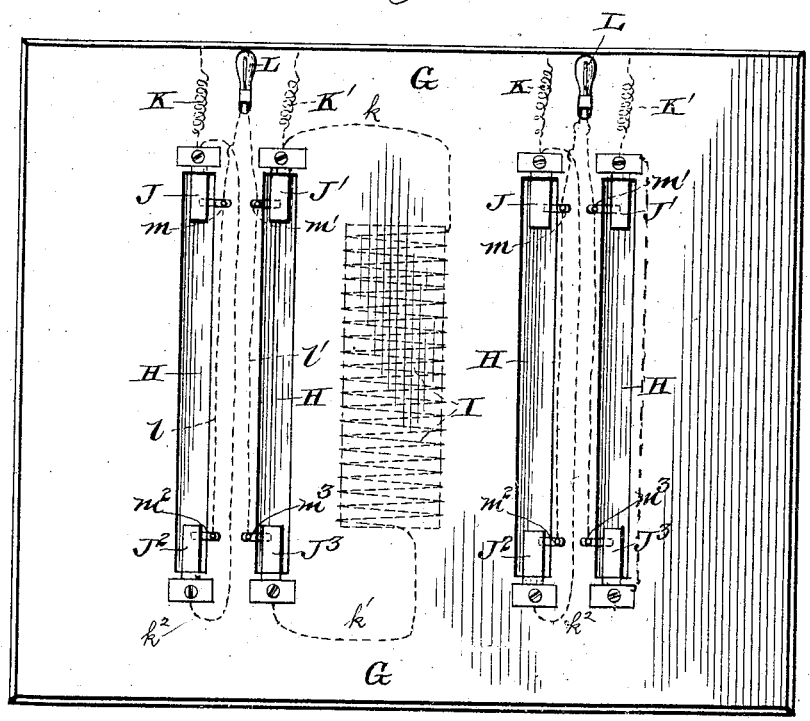

In the accompanying drawings, Figure 1 represents a plan view of a range or other support embodying my invention, the utensil being indicated in outline and the projectors thereof by dotted lines. Fig. 2 represents on an enlarged scale a similar view of a part of the same, showing the pilot-lamp in position. Fig. 3 represents a vertical section through the utensil and a part of the range on the line x—x of Fig. 1, showing the projectors and contact pieces in contact. Fig. 4 represents a view similar to Fig. 1 of another modification but without the utensil and showing the connections of the pilot lamps.

A designates the body of the utensil; B, its removable base; C, the resistance in the said base; D, the insulating cement therefor; E, the projectors connected with the ends of the said resistance; and F the strips insulating the said projectors from the said base.

G designates the body of the range or other support, H the grooves arranged in the top thereof in parallel pairs, and I the resistance arranged in the said range or support. The said grooves are provided at their ends with pairs of contact plates, springs or pieces J J', or J² J³. The contacts J J' of each pair of grooves are provided with circuit feed wires K K'. The contacts J² J³ of one pair of grooves are provided in like manner with circuit feed wires K² K³. The two pairs of contacts of this pair of grooves are entirely unconnected with each other. When the projectors E of the utensil, sliding along the said grooves, are brought into contact with either pair of the contact plates J J' or J² J³ arranged therein, the entire force of the electric current will pass through the resistance C of the utensil producing a hot quick fire. The contacts J² J³ of the other pair of grooves are used for producing a slow fire. For this purpose wires $k\ k'$ connect the contacts J' J³ respectively with opposite ends of a heat regulating resistance I, and a wire $k^2$ connects the contact J with the contact J². When the projectors of the utensil fit into the contacts J² J³ of this pair of grooves the circuit will be through contact J', wire $k$, resistance I, wire $k'$, contact J³, the projectors and resistance of the utensil, contact J², wire $k^2$ and contact J consequently lessening the heat producing power in the utensil by the interposition of the resistance I in the circuit. The effect is the same as that of a slow fire. By shifting the utensil and its projectors along this pair of guiding grooves, the cook may exchange a slow fire for a hot one or vice versa at will, or may cut off the heat altogether by leaving the said utensil midway and therefore out of circuit. There is no necessity for removing the utensil or implement for any of these proceedings. The grooves insure its movement in a straight line with accuracy of circuit-making or circuit-breaking. The sides or walls of the groove also prevent the utensil from being tilted over and hold it in the position desired. Nevertheless it is not attached in any way to the range, but may be lifted off from the latter vertically without impediment, when there is need.

The contact pieces shown in the application aforesaid, Serial No. 500,136, and in Fig. 1 of the present application are of a bent or broadly U-shaped kind, practically parallel to the sides of the grooves and presenting their convex faces outward. For greater security of circuit-closing action and for operating the lamps as hereinafter stated, I prefer to give these contact pieces a flaring shape as shown, and to arrange them at the ends of the grooves, facing lengthwise thereof as shown in Fig. 2; although depressible contact pieces attached at one end only may be employed as in Fig. 4.

As the majority of persons who will use these ranges and utensils are untrained in electrical matters, it becomes important to provide unmistakable means for automatically indicating the closing of the circuit. To this end I employ for each pair of grooves a lamp L connected by wires $l\ l'\ l^2\ l^3$ to contact posts $m\ m'\ m^2\ m^3$, which the flexible contact springs J J' J² J³ respectively are forced against by the pressure of the projectors E when these spread the fork-shaped contact-springs, Fig. 2, by entering them, or rest upon those of the flat form shown in Fig. 4. In the former case, each contact post is at one side of the contact spring which is to be held against it. In the latter case it is directly below the spring. In either case when the utensil is in position over any pair of the said contact pieces, the projectors being in or on them the circuit is closed through the lamp belonging to that pair of grooves, which at once becomes luminous and so continues while the heating action is going on. When the utensil is lifted or moved along the grooves out of such engagement, the heating action ceases instantly and the lamp is simultaneously darkened. I denominate these lamps pilot-lamps because they afford a sure guide to the condition of the circuits and the heating and cooking. I prefer phosphor bronze for the contact pieces and posts though many other materials will answer.

It is obvious that the customary fuses should be used for each circuit, conveniently located; that lids or covers should be placed over the contact springs to prevent accumulation of dirt and the meddling of children and that the material employed in the construction of the range, table, side-board, or other support should withstand heat and water and be of electrically insulating material or otherwise insulated. Enameled iron, soapstone, marble, durite, artificial or natural wood rendered incombustible and waterproof will answer the purpose admirably.

Having thus described my invention, what I claim as new, and desire to secure by Letters Patent, is—

1. A range or other support provided with a pair of grooves, which are for a portion of their length provided with contact surfaces and having the remaining portion not so provided, so that the article may be placed in or out of circuit by merely sliding it along the grooves substantially as set forth.

2. In an electric heating apparatus or system the combination of a support provided with a pair of grooves having a pair of contacts at each end, with an implement or utensil provided with projecting conducting parts and interposed resistance, an additional heat regulating resistance, electric conductors making circuit through the latter resistance and one pair of the said contacts, and additional electrical conductors making circuit through the other pair of contacts but not through the said heat regulating resistance the shifting of the utensil from one pair of contacts to the other along the said grooves regulating the heating effect so as to correspond to that of a slow fire or a quick fire substantially as set forth.

3. In combination with a utensil or article having a resistance within it and provided with rigid conducting parts which are connected to the ends of the said resistance, a range or other support having a pair of flexible or yielding contact pieces, circuit wires running to the said pieces, contact posts arranged to be touched by the said yielding contact pieces when the latter are moved by the pressure of said conductors, and an electric lamp and its wires connecting with the said posts, the circuit being closed through the said lamp and the resistance in the utensil simultaneously, substantially as set forth.

4. An article or utensil provided with an insulator and rigid conductors attached to the ends of the said insulator and in combination with a range table or other support having depressible contact-pieces arranged to receive the pressure of the said conductors or feet when the latter are set on them circuit wires or equivalent conductors running to the said contact pieces and an electric lamp and connections arranged to be brought into the circuit when the said springs are thus depressed substantially as set forth.

In testimony whereof I affix my signature in presence of two witnesses.

HENRY G. O'NEILL.

Witnesses:
   EDWIN W. PIERCE,
   PELATIAH R. TRIPP